United States Patent
Ikeda

(10) Patent No.: US 9,108,698 B2
(45) Date of Patent: Aug. 18, 2015

(54) SUSPENSION APPARATUS AND SUSPENSION SYSTEM

(71) Applicant: Showa Corporation, Gyoda-shi (JP)

(72) Inventor: Daisuke Ikeda, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/313,205

(22) Filed: Jun. 24, 2014

(65) Prior Publication Data

US 2015/0091271 A1 Apr. 2, 2015

(30) Foreign Application Priority Data

Sep. 27, 2013 (JP) ................................. 2013-202655
Nov. 28, 2013 (JP) ................................. 2013-246560

(51) Int. Cl.
*B62K 25/08* (2006.01)
*B60G 11/27* (2006.01)

(52) U.S. Cl.
CPC ................ *B62K 25/08* (2013.01); *B60G 11/27* (2013.01)

(58) Field of Classification Search
CPC ......... B60G 11/27; B60G 11/26; B62K 25/08
See application file for complete search history.

(56) References Cited

U.S. PATENT DOCUMENTS

| 4,058,301 | A | * | 11/1977 | Petrisko | ........................ 267/124 |
| 5,279,480 | A | * | 1/1994 | Derrien | ................... 244/104 FP |
| 2005/0230887 | A1 | * | 10/2005 | Martinez et al. | ........... 267/64.26 |
| 2007/0056817 | A1 | * | 3/2007 | Ward | ............................ 188/314 |
| 2007/0278752 | A1 | * | 12/2007 | Schedgick | ................. 280/5.507 |
| 2009/0314592 | A1 | * | 12/2009 | Nygren | ...................... 188/266.6 |
| 2013/0221634 | A1 | | 8/2013 | Aoki | |

FOREIGN PATENT DOCUMENTS

| JP | 11-030263 A | 2/1999 |
| JP | 4610001 B | 1/2011 |
| JP | 2012-092945 A | 5/2012 |
| JP | 2013-181544 A | 9/2013 |

* cited by examiner

*Primary Examiner* — Kevin Hurley
(74) *Attorney, Agent, or Firm* — Leason Ellis LLP

(57) ABSTRACT

A first front fork includes an outer tube, an inner tube, a tubular cylinder provided inside the outer tube and the inner tube, a rod member moving relatively in an axial direction of the cylinder and having a space portion inside, which is formed in the axial direction, a piston fixed to an end portion of a wheel side of the rod member and sectioning a space in the cylinder into part of a rebound air spring chamber and an inner air spring chamber and a rod guide fixed to an end portion of a vehicle-body side of the cylinder and sectioning a space in the inner tube into part of the rebound air spring chamber and an outer air spring chamber.

8 Claims, 10 Drawing Sheets

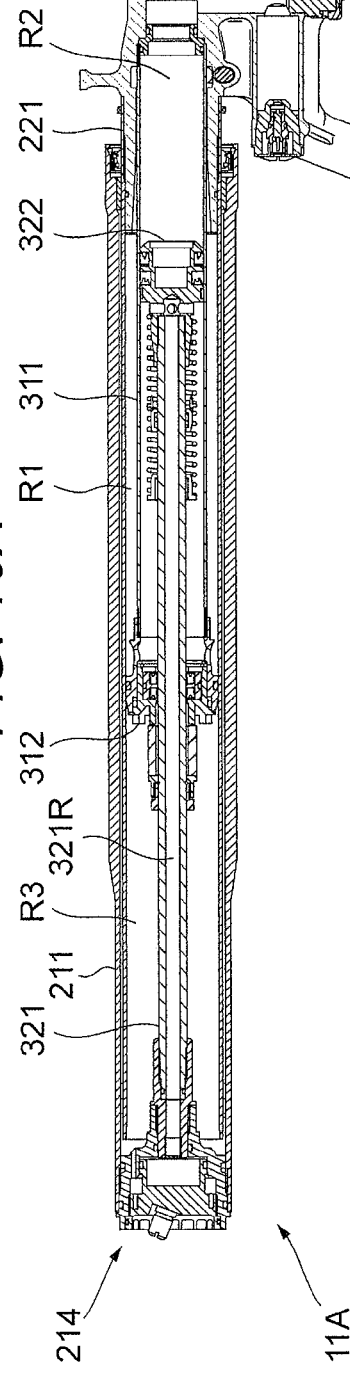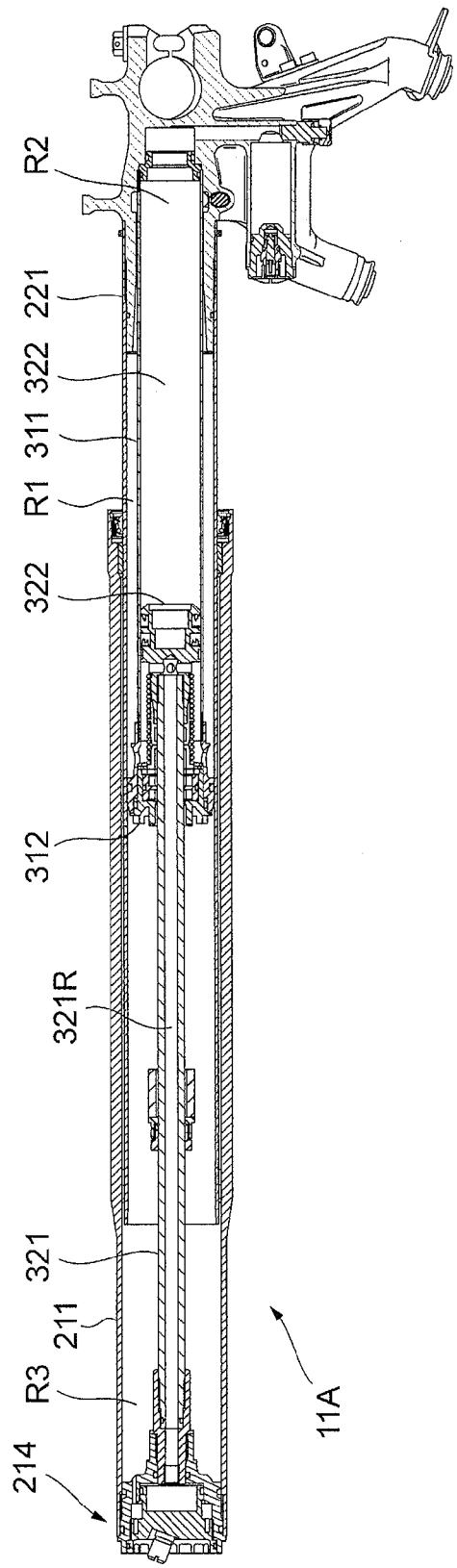
FIG. 10A
FIG. 10B

SUSPENSION APPARATUS AND SUSPENSION SYSTEM

CROSS-REFERENCE TO RELATED APPLICATIONS

This application is based on and claims priority under 35 USC 119 from Japanese Patent Applications No. 2013-202655 filed on Sep. 27, 2013, and No. 2013-246560 filed on Nov. 28, 2013, the entire content of which is incorporated herein by reference.

BACKGROUND OF THE INVENTION

1. Field of the Invention

The present invention relates to a suspension apparatus and a suspension system.

2. Description of Related Art

For example, there is disclosed a front fork including a damper leg and a spring leg arranged in parallel in JP-A-2012-92945 (Patent Document 1), in which the spring leg is constructed by inserting a vehicle body side tube into an axle side tube or vice versa, disposing a guide cylinder at a center inside one of the vehicle body side tube and the axle side tube and inserting a guide of a guide rod disposed at a center inside the other of the vehicle body side tube and the axle side tube into the guide cylinder, which has an inner air spring chamber sectioned, inside the guide cylinder, by a guide of the guide rod, an outer air spring chamber sectioned, at least outside the inner air spring chamber in the guide cylinder, by the vehicle body side tube and the axle side tube, and a rebound air spring chamber sectioned by a rod guide provided at the guide cylinder into which the guide rod is inserted to support the guide rod and the guide of the guide rod.

SUMMARY OF THE INVENTION

However, for example, in the front fork described in Patent Document 1, the rebound air spring chamber is constructed by a limited section sectioned by being sandwiched between the rod guide and the guide of the guide rod inserted into the guide cylinder. Accordingly, it is difficult to secure a sufficient capacity in the rebound air spring chamber. As a result, a compression ratio of the rebound air spring chamber is liable to be excessively increased, and it is difficult to stabilize a reaction force in the vicinity of the maximum extension in the extension-side stroke, therefore, difficulty may occur in operational stability.

In view of the above, an object of the present invention is to provide a suspension apparatus and so on capable of securing a capacity of a first chamber which is, for example, a rebound air spring chamber to be larger to thereby suppress a compression ratio of the first chamber so as not to increase excessively.

According to a first aspect of the present invention, there is provided a suspension apparatus including a vehicle-body side member formed in a tubular shape and positioned on a vehicle body side, a wheel side member formed in a tubular shape and positioned on a wheel side, the wheel side member connecting to the vehicle-body side member, moving relatively with respect to the vehicle-body side member in an axial direction of the vehicle-body side member, a tubular cylinder provided inside the vehicle-body side member and the wheel side member, a rod member positioned inside the vehicle-body side member and the wheel side member, moving relatively in an axial direction of the cylinder with movement of the vehicle-body side member and the wheel side member, a first sectioning member fixed to an end portion of a wheel side of the rod member and provided in a manner of contacting the cylinder so as to move in the axial direction of the cylinder to thereby section a space in the cylinder and a second sectioning member fixed to an end portion of a vehicle-body side of the cylinder and sectioning a space in the wheel side member, in which a first chamber positioned on a rod member side of the first sectioning member and on a cylinder side of the second sectioning member to accommodate fluid, a second chamber positioned on an opposite side of the rod member side of the first sectioning member to accommodate fluid and a third chamber positioned on an opposite side of the cylinder side of the second sectioning member to accommodate fluid are formed by the first sectioning member and the second sectioning member, each of the first to third chambers includes a filler gas inside in a sealed stated so as to function as an air spring, and the first to third chambers fail to communicate with each other.

In the suspension apparatus according a second aspect of the present invention, the cylinder may be fixed so as to move with the wheel-side member in an end portion of the wheel side, and the rod member may be fixed so as to move with the vehicle-body side member in an end portion of the vehicle-body side.

In the suspension apparatus according a third aspect of the present invention, the first chamber may include a space on the rod member's side in the space sectioned by the first sectioning member in the cylinder, and a space on the cylinder's side in a space between the wheel side member and the cylinder, which is sectioned by the second sectioning member.

The suspension apparatus according a fourth aspect of the present invention further includes injection ports for injecting a capacity adjustment material for adjusting a capacity of the first chamber and a capacity of the second chamber.

In the suspension apparatus according a fifth aspect of the present invention, the rod member may have a space portion inside, which is formed in the axial direction and the space portion may be connected to the first chamber.

The suspension apparatus according to a sixth aspect of the present invention further includes a gas pressure adjustment portion for adjusting a pressure of a filler gas in the second chamber, in which the second chamber and the gas pressure adjustment portion communicate with each other through a tube.

In the suspension apparatus according a seventh aspect of the present invention, the first sectioning member may include a lateral-pressure reducing member that reduces a lateral pressure generated between the first sectioning member and the cylinder.

According to an eighth aspect of the present invention, there is also provided a suspension system including first suspension unit including a suspension spring made of an air spring and a second suspension unit including a damping mechanism, in which the first suspension unit has a vehicle-body side member formed in a tubular shape and positioned on a vehicle body side, a wheel side member formed in a tubular shape and positioned on a wheel side, the wheel side member connecting to the vehicle-body side member, moving relatively with respect to the vehicle-body side member in an axial direction of the vehicle-body side member, a tubular cylinder provided inside the vehicle-body side member and the wheel side member, a rod member positioned inside the vehicle-body side member and the wheel side member, moving relatively in an axial direction of the cylinder with movement of the vehicle-body side member and the wheel side member, a first sectioning member fixed to an end portion of a wheel side of the rod member and provided in a manner of contacting the cylinder so as to move in the axial direction of the cylinder to thereby section a space in the cylinder, and a second sectioning member fixed to an end portion of a vehicle-body side of the cylinder and sectioning a space in the wheel side member, in which a first chamber positioned on a rod member side of the first sectioning member and on the cylinder side of the second sectioning member to accommodate fluid, a second chamber positioned on an opposite side of the rod member side of the first sectioning member to accommodate fluid and a third chamber positioned on an opposite side of the cylinder side of the second sectioning member to accommodate fluid are formed by the first sectioning member and the second sectioning member, each of the first to third chambers includes a filler gas inside in a sealed state so as to function as an air spring, and the first to third chambers fail to communicate with each other.

According to the first aspect of the invention, the capacity of the first chamber can be secured to be larger and a compression ratio of the first chamber can be suppressed not to be increased excessively by providing the second sectioning member.

Also according to the second aspect of the invention, capacities of the first chamber and the second chamber can be adjusted easily only by changing a length of the cylinder as an upright-type cylinder is applied.

Also according to the third aspect of the invention, the space between the wheel side member and the cylinder can be added as the capacity of the first chamber by sectioning the space by the second sectioning member.

Also according to the fourth aspect of the invention, capacities of the first chamber and the second chamber can be adjusted easily by providing injection ports for injecting the capacity adjustment material.

Also according to the fifth aspect of the invention, the capacity of the space portion can be added to the first chamber by providing the space portion inside the rod member.

Also according to the sixth aspect of the invention, it is possible to suppress spouting of the capacity adjustment material and so on in the second chamber as the second chamber and the gas pressure adjustment portion communicate with each other through the tube.

Also according to the seventh aspect of the invention, sealing performance between the first sectioning member and the cylinder is improved.

Also according to the eighth aspect of the invention, the capacity of the first chamber can be secured to be larger and the compression ratio in the first chamber can be suppressed not to be increased excessively by providing the second sectioning member in the first suspension means.

BRIEF DESCRIPTION OF THE DRAWINGS

FIGS. 10A and 10B are views explaining operations in a compression-side stroke and an extension-side stroke of the first front fork leg.

DETAILED DESCRIPTION OF THE INVENTION

Hereinafter, an embodiment of the present invention will be explained in detail with reference to the attached drawings.

Figure 1:
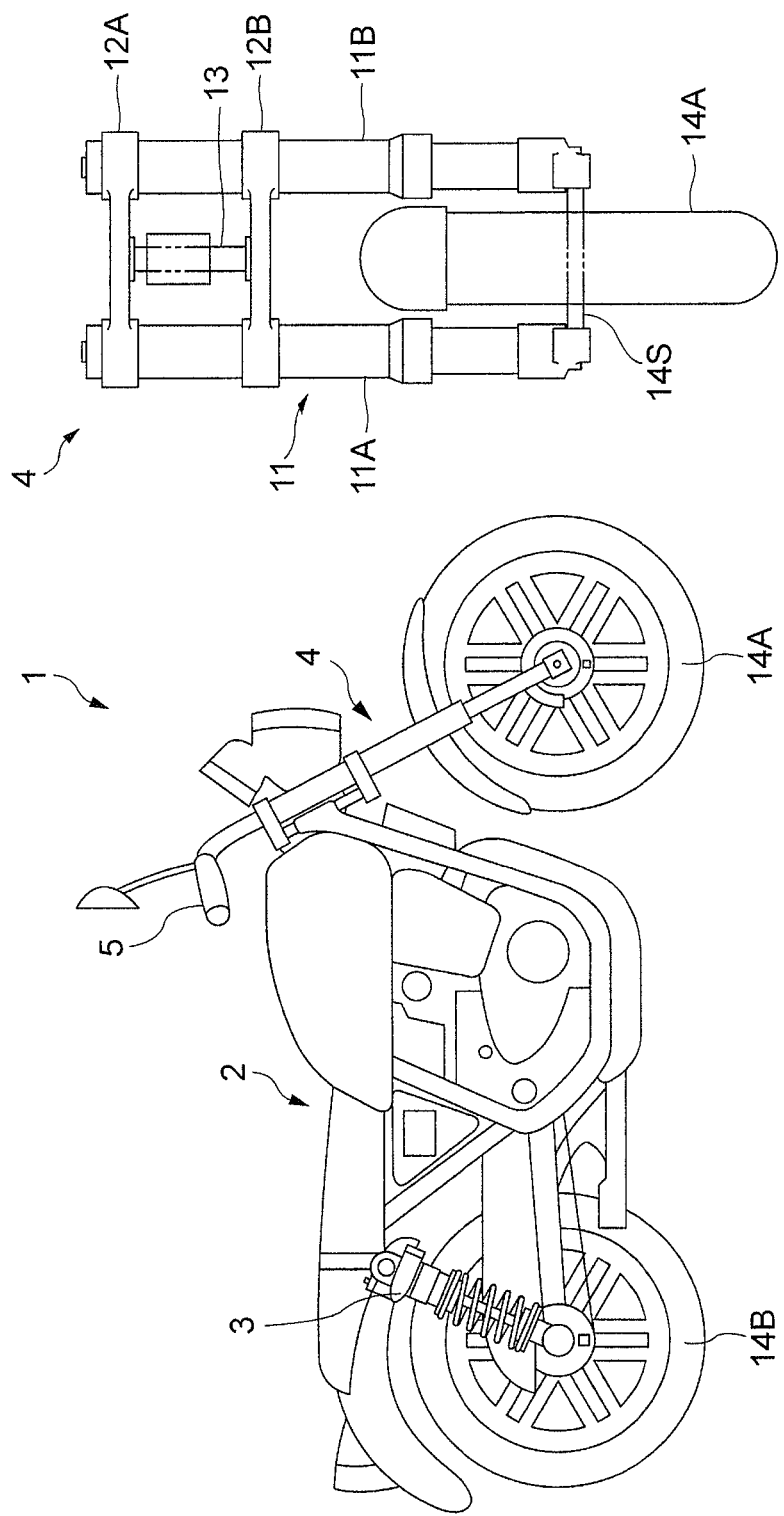
FIG. 1A is a view explaining a motorcycle applying a front fork according to a present embodiment.
FIG. 1B is a view explaining the front fork according to the embodiment.

FIG. 1A is a view explaining a motorcycle applying a front fork according to the present embodiment. FIG. 1B is a view explaining the front fork according to the embodiment.

A motorcycle 1 shown in FIG. 1A includes a vehicle body 2, a front wheel 14A which is a wheel arranged in a front part of the vehicle body 2, a rear wheel 14B which is a wheel arranged in a rear part of the vehicle body 2, a rear suspension 3 connecting the vehicle body 2 to the rear wheel 14B, a front fork 4 connecting the vehicle body 2 to the front wheel 14A and a handlebar 5 for steering the motorcycle 1.

The front fork 4 (suspension system) according to the embodiment is an upside-down front fork as shown in FIG. 1B. The front fork 4 includes a first front fork leg 11A as an example of a first suspension means (suspension apparatus), a second front fork leg 11B as an example of a second suspension means, a first bracket 12A, a second bracket 12B and a steering shaft 13. The front fork 4 is provided so as to connect between the handlebar 5 and the front wheel 14A of, for example, a two-wheeled vehicle or a three-wheeled vehicle, absorbing a shock as well as transmitting the steering of the handlebar 5 to the front wheel 14A.

The first front fork leg 11A and the second front fork leg 11B are arranged in right and left of the front wheel 14A, connecting to the front wheel 14A through an axle 14S. In addition, the first front fork leg 11A and the second front fork leg 11B are constructed so as to be extended and contracted in an axial direction. In the embodiment, a longitudinal direction of the first front fork leg 11A is called the "axial direction" in the following explanation.

The first front fork leg 11A does not include, for example, a "damping mechanism". Besides, the first front fork leg 11A includes a suspension spring made of an air spring, not a metal spring. Also in the embodiment, the second front fork leg 11B includes a damping mechanism such as an oil damper and does not include the metal spring. However, the second front fork leg 11B may have the same structure as the first front fork leg 11A.

The first bracket 12A and the second bracket 12B connect between the first front fork leg 11A and the second front fork leg 11B. Both ends of the steering shaft 13 are fixed to the first bracket 12A and the second bracket 12B respectively. The steering shaft 13 is coupled to the vehicle body 2, thereby connecting the front fork 4 to the vehicle body 2 so as to be steered (rotated).

Figure 2:
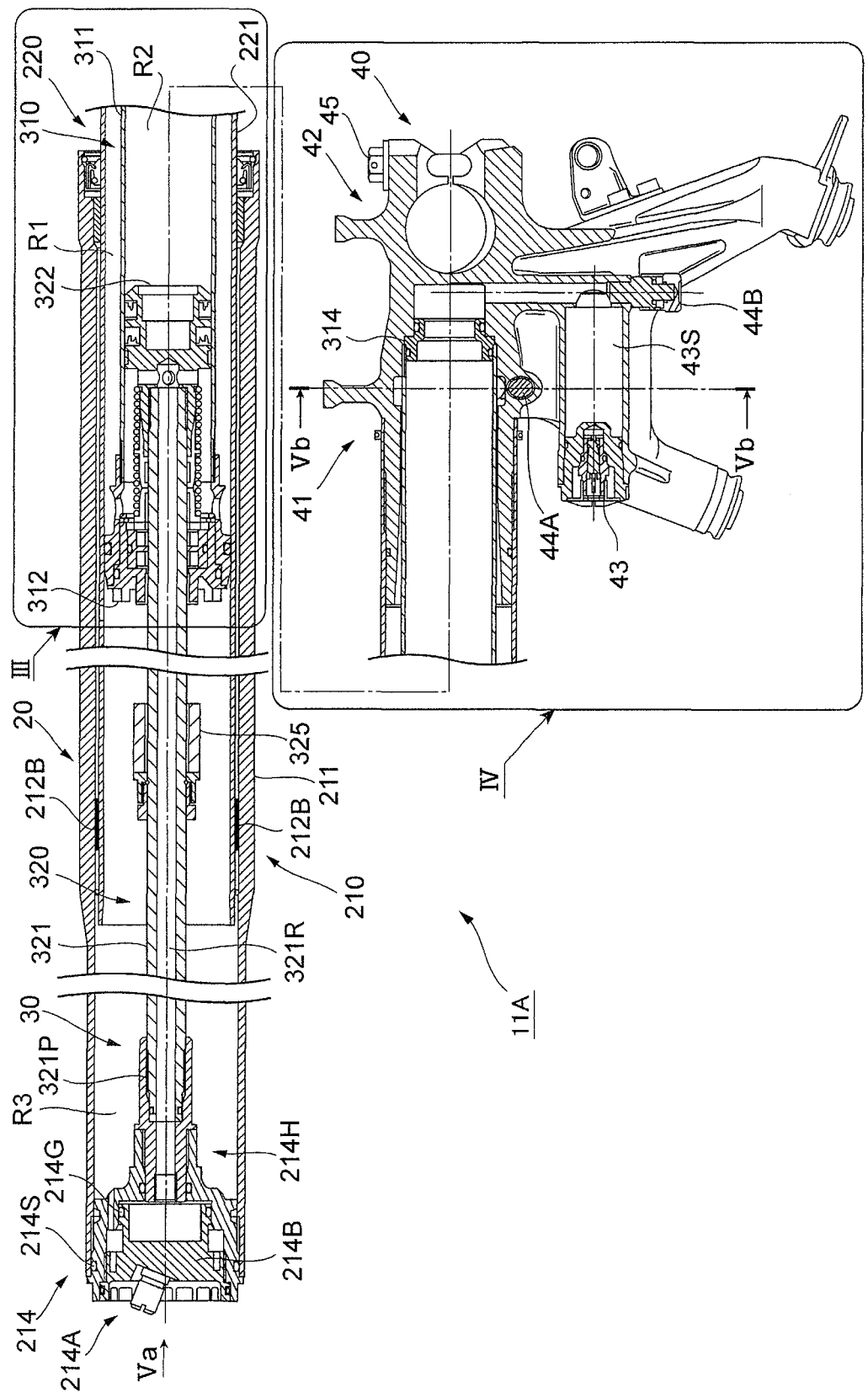
FIG. 2 is a view for explaining a first front fork leg.

FIG. 2 is a view for explaining the first front fork leg 11A.

Figure 3:
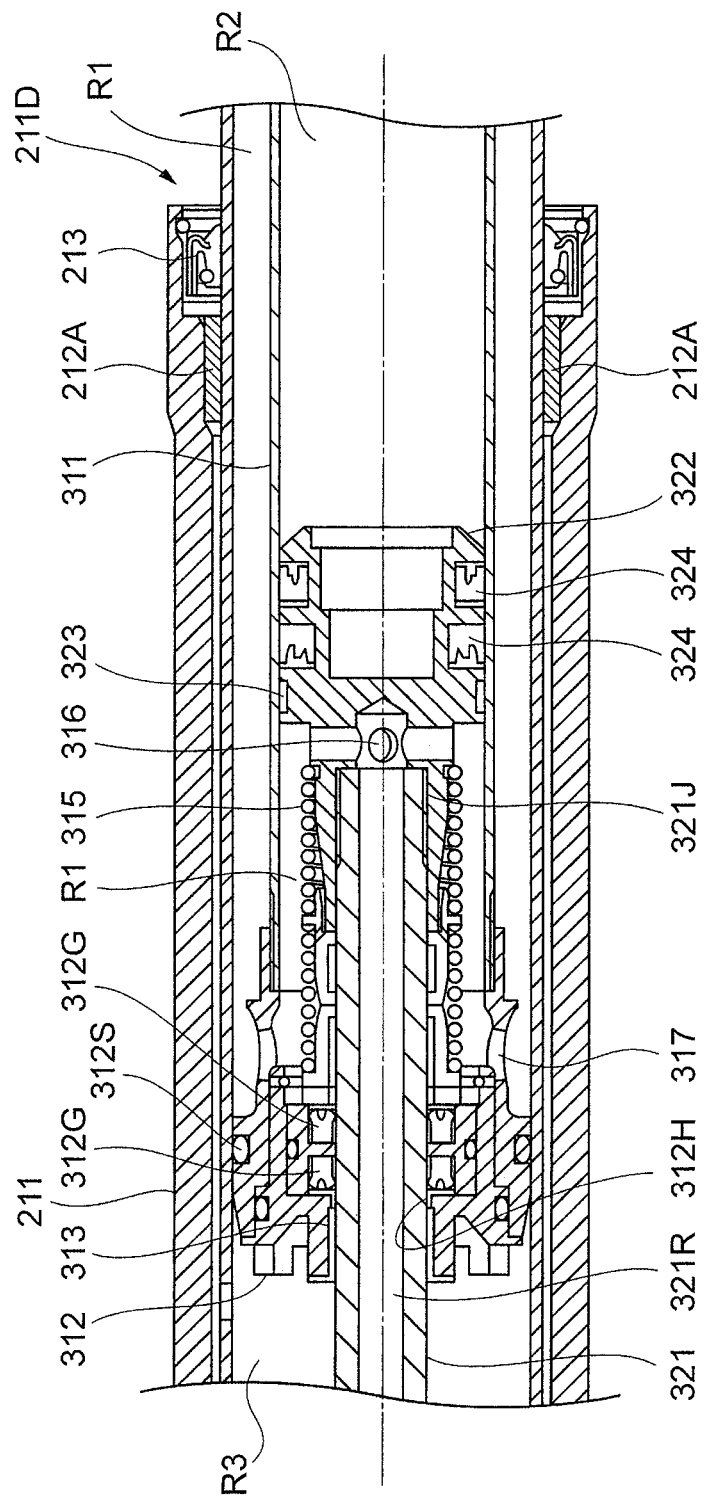
FIG. 3 is an enlarged view of a part "III" in the first front fork leg shown in FIG. 2.

FIG. 3 is an enlarged view of a part "III" in the first front fork leg 11A shown in FIG. 2.

Figure 4:
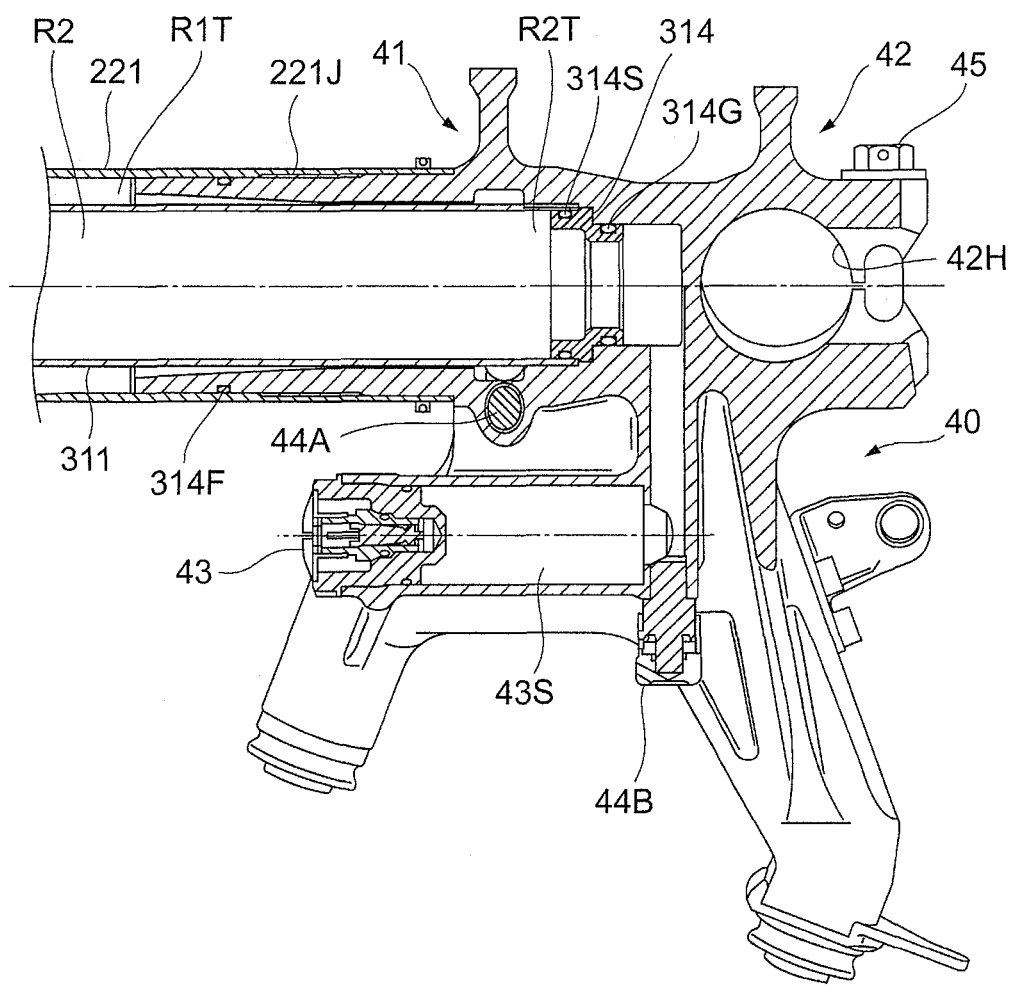
FIG. 4 is an enlarged view of a part "IV" in the first front fork leg shown in FIG. 2.

FIG. 4 is an enlarged view of a part "IV" in the first front fork leg 11A shown in FIG. 2.

Figures 5A, 5B:
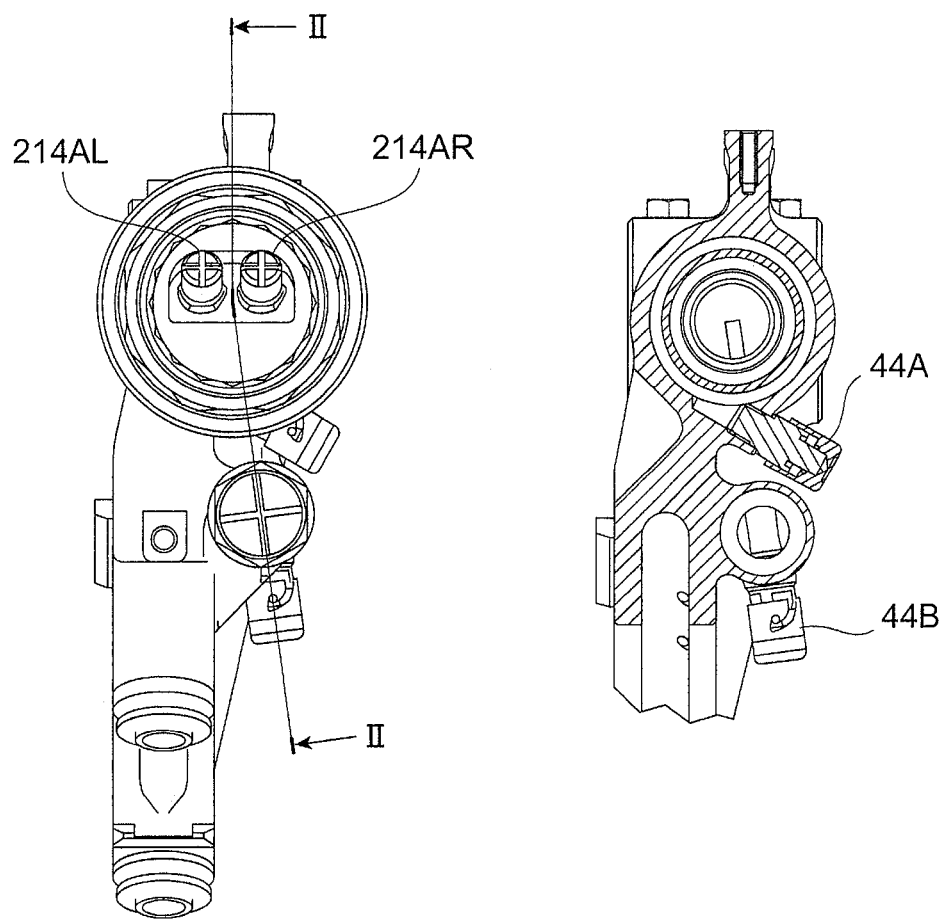
FIG. 5A is a view of the first front fork leg shown in FIG. 2 seen from a direction Va.
FIG. 5B is a Vb-Vb cross-sectional view of the first front fork leg shown in FIG. 2.

FIG. 5A is a view of the first front fork leg 11A shown in FIG. 2 seen from a direction Va. FIG. 5B is a Vb-Vb cross-sectional view of the first front fork leg 11A shown in FIG. 2.

The first front fork leg 11A includes an outer tubular portion 20, an inner tubular portion 30 and an axle bracket portion 40 as shown in FIG. 2.

The outer tubular portion 20 includes an outer tube portion 210 as an example of a vehicle-body side member and an inner tube portion 220 as an example of a wheel side member as shown in FIG. 2.

(Outer Tube Portion 210)

The outer tube portion 210 includes an outer tube 211 which is a tubular member, a bush 212A and a seal member 213 arranged at an end portion of a wheel side of the outer tube 211, a bush 212B pressure-fitted to the outer tube 211 so as to be located in the vicinity of an end portion of a vehicle body side of an inner tube 221 at a time of maximum extension and a fork bolt portion 214 arranged at an end portion of a vehicle body side of the outer tube 211.

The outer tube 211 is positioned on a vehicle body side in the embodiment. The outer tube 211 is provided with an expanded tube portion 211D for holding the bush 212A and the seal member 213 at an end portion of the wheel side.

The bush 212A is an annular member and is provided in an inner peripheral portion of the above expanded tube portion 211D as shown in FIG. 3. The bush 212B is an annular member similar to the bush 212A and is provided between the outer tube 211 and the inner tube 221. The bushes 212A and 212B reduce friction resistance with respect to the inner tube 221 so as to face an outer peripheral surface of the inner tube 221. Then, the outer tube 211 and the inner tube 221 are connected to each other so as to slide in the axial direction through the bushes 212A and 212B.

The seal member 213 is a ring-shaped member and is attached to an inner peripheral portion of the expanded tube portion 211D. Then, the seal member 213 seals a later-described outer air spring chamber R3 (third chamber) air-tightly, which is formed by the outer tube 211 and the inner tube 221.

The fork bolt portion 214 includes a bolt 214B, a first seal member 214S, a second seal member 214G, a gas pressure adjustment portion 214A and a rod holding portion 214H as shown in FIG. 2.

The bolt 214B is screwed inside the outer tube 211 and air-tightly fixed in the end portion of the vehicle body side of the outer tube 211. Then, the bolt 214B blocks an opening of the vehicle body side of the outer tube 211.

The first seal member 214S and the second seal member 214G are positioned between the outer tube 211 and the bolt 214B, sealing a gap between the bolt 214B and the outer tube 211. Then, the first seal member 214S and the second seal member 214G respectively seal a later-described rod inner chamber 321R and the outer air spring chamber R3.

The gas pressure adjustment portion 214A is attached to the bolt 214B at a position facing the outside. The gas pressure adjustment portion 214A includes a first gas pressure adjustment portion 214AL and a second gas pressure adjustment portion 214AR as shown in FIG. 5A. The first gas pressure adjustment portion 214AL and the second gas pressure adjustment portion 214AR are arranged in right and left in the figure. The first gas pressure adjustment portion 214AL communicates with the rod inner chamber 321R, and the second gas pressure adjustment portion 214AR communicates with the outer air spring chamber R3. Accordingly, outflow of gas from the inside to the outside is prevented and a filler gas pressure in the rod inner chamber 321R or the outer air spring chamber R3 can be adjusted at a time of adjustment.

As the rod inner chamber 321R communicates with a rebound air spring chamber R1 as described later, the adjustment of the filler gas pressure in the rod inner chamber 321R is equivalent to the adjustment of the filler gas pressure in the rebound air spring chamber R1. A rubber film and so on through which an injector needle of a gas-pressure injector can pierce can be used for the gas pressure adjustment portion 214A.

The rod holding portion 214H is a member for connecting and holding a later-described rod member 321. The rod member 321 is connected to the rod holding portion 214H to thereby be air-tightly fixed to the outer tube 211 through the rod holding portion 214H, the first seal member 214S and the second seal member 214G.

(Inner Tube Portion 220)

The inner tube portion 220 has the inner tube 221 which is a tubular member as shown in FIG. 2.

The inner tube 221 is positioned on a wheel side in the embodiment. An outer diameter of the inner tube 221 is formed to be smaller than an inner diameter of the outer tube 211. Then, the inner tube 221 is inserted into the outer tube 211. Therefore, the inner tube 221 is connected to the outer tube 211 and moves relatively with respect to the axial direction of the outer tube 211. In the inner tube 211, an end portion of a wheel side is fixed to the front wheel 14A and an end portion of a vehicle body side is inserted into the outer tube 211.

In the inner tube 221, a female screw portion 221J forming a connection portion with respect to the axle bracket portion 40 is formed on the wheel side. Additionally, the end portion of the vehicle body side of the inner tube 221 is opened.

The inner tubular portion 30 includes a cylinder portion 310 and a rod portion 320 as shown in FIG. 2.

(Cylinder Portion 310)

The cylinder portion 310 includes a cylinder 311 which is a tubular member, a rod guide 312 as an example of a second sectioning member, a bush 313 arranged at an end portion of a vehicle body side of the rod guide 312, a bottom piece 314 arranged at an end portion of a wheel side of the cylinder 311 and a rebound spring 315 arranged between the rod guide 312 and a later-described piston 322.

The cylinder 311 is provided inside the outer tube portion 210 and the inner tube portion 220, which is positioned on the wheel side in the embodiment. That is, a so-called upright type in which the cylinder 311 is positioned on the wheel side and the later-described rod member 321 is positioned on the vehicle body side is applied in this case.

The rod guide 312 is fixed to an end portion of the vehicle body side of the cylinder 311. That is, the rod guide 312 is positioned at the end portion of the vehicle body side of the cylinder 311 and fixed to the end portion of the cylinder 311 by screw clamping and so on as shown in FIG. 3. The rod guide 312 is provided so as to contact the inner tube 221. Furthermore, the rod guide 312 has a through hole 312H having a larger inner diameter than an outer diameter of the rod member 321 (described later). The rod guide 312 supports the rod member 321 (described later) so as to be slidable, which pierces through the through hole 312H. The rod guide 312 also has an outer seal member 312S provided in an outer periphery of the rod guide 312 and an inner seal member 312G provided in an inner periphery thereof. A gap between the rod guide 312 and the inner tube 221 is sealed with the outer seal member 312S. A gap between the rod guide 312 and the rod member 321 is sealed with the inner seal member 312G.

The bush 313 is attached to the through hole 312H so as to face the rod member 321. Then, the bush 313 reduces friction resistance between the rod member 321 and the rod guide 312. Furthermore, the bush 313 guides sliding between the rod member 321 and the rod guide 312.

The bottom piece 314 is arranged at the end portion of the wheel side of the cylinder 311 as shown in FIG. 4. The bottom piece 314 has a cylindrical shape. Then, the bottom piece 314 is arranged between the end portion of the wheel side of the cylinder 311 and the axle bracket portion 40. In doing so, the cylinder 311 is fixed at the end portion of the wheel side so as to move with the inner tube 221.

The bottom piece 314 has a first seal member 314S and a second seal member 314G at an outer periphery. The bottom piece 314 seals a gap between the cylinder 311 and the axle bracket member 40 through the first seal member 314S and the second seal member 314G.

The rebound spring 315 is made of, for example, a metal coil spring. A spring force of the rebound spring 315 biases the outer tube 211 and the inner tube 221 in a contracting direction.

In the embodiment, a space inside the inner tube 221 is sectioned by the rod guide 312. Specifically, part of the rebound air spring chamber R1 (a first chamber) is formed in a cylinder 311 side which is a wheel side of the rod member 321 and the outer air spring chamber R3 (a third chamber) is formed in an opposite side of the cylinder 311 side, namely, on a vehicle body side of the rod member 321.

(Rod Portion 320)

The rod portion 320 includes the rod member 321 which is a rod-like member extending along the axial direction, a piston 322 arranged at an end portion of the wheel side of the rod member 321, a piston ring 323 and a seal member 324 attached to the piston 322 and a bump rubber 325 as shown in FIG. 3. In the embodiment, a first sectioning member is constructed by the piston 322, the piston ring 323 and the seal member 324.

The rod member 321 is positioned inside the outer tube 211 and the inner tube 221, relatively moving in the axial direction of the cylinder 311 with the movement of the outer tube 211 and the inner tube 221. The rod inner chamber 321R (space portion) which is a through hole extending from the end portion of the wheel side to the end portion of the vehicle body side in the axial direction is formed inside the rod member 321. That is, the rod member 321 in the embodiment is formed in a hollow shape.

The rod member 321 is provided with a vehicle-body side male screw portion 321P connecting to the rod holding portion 214H at the end portion on the vehicle-body side as shown in FIG. 2. Then, the rod member 321 is fixed to the outer tube 211 through the rod holding portion 214H by connecting the rod holding portion 214H to the vehicle-body side male screw portion 321P. Accordingly, the rod member 321 is fixed so as to move with the outer tube 211 at the end portion of the vehicle body side.

In the rod member 321, a wheel-side male screw portion 321J for connecting to the piston 322 is formed on the wheel side as shown in FIG. 3. Then, the rod member 321 holds the piston 322 by the wheel-side male screw portion 321J. Moreover, the rod inner chamber 321R inside the rod member 321 communicates with and connects to the rebound air spring chamber R1 (the first chamber) through a hole portion 316 on the wheel side.

The piston 322 is fixed to the end portion of the wheel side of the rod member 321. Specifically, the piston 322 is held by the wheel-side male screw portion 321J of the rod member 321 as shown in FIG. 3. Then, the piston 322 is provided in a manner of contacting the cylinder 311 so as to move in the axial direction of the cylinder 311.

The piston ring 323 is an annular member and attached to an outer peripheral portion of the piston 322. An outer diameter of the piston ring 323 is set to be approximately equal to an inner diameter of the cylinder 311.

The seal member 324 is an annular member and attached to the outer peripheral portion of the piston 322. Two seal members 324 in total are provided in the embodiment.

The bump rubber 325 absorbs the shock occurring when the first front fork leg 11A is contracted to the full by receiving a load as well as prescribes the most compressed position. More specifically, as the outer tube 211 and the inner tube 221 move in directions relatively coming close to each other in the axial direction, the bump rubber 325 contacts the rod guide 312 first. Then, after the bump rubber 325 approximately 4 mm deflects, metal-to-metal contact occurs between the rod holding portion 214H and the inner tube 221 to limit the stroke, and this position will be the most compressed position.

In the embodiment, the piston 322, the piston ring 323 and the seal member 324 section a space inside the cylinder 311. Specifically, part of the rebound air spring chamber R1 (the first chamber) is formed in the rod member 321 side as a vehicle-body side of the piston 322, and an inner air spring chamber R2 (a second chamber) is formed in an opposite side of the rod member 321 side as a wheel side of the piston 322.

In the inner tubular portion 30 constructed as described above, the rod inner chamber 321R communicates with the rebound air spring chamber R1 formed by the inner tube 221 and the cylinder 311 through the hole portion 316 as shown in FIG. 2. That is, in the inner tubular portion 30, the rebound air spring chamber R1 is connected to the rod inner chamber 321R so that a gas can be circulated to each other.

The rebound air spring chamber R1 is sealed with the seal member 324 of the piston 322, the outer seal member 312S and the inner seal member 312G of the rod guide 312 and so on. Therefore, the gas in a space formed by the rebound air spring chamber R1 and the rod inner chamber 321R is maintained in the sealed state.

Figure 6:
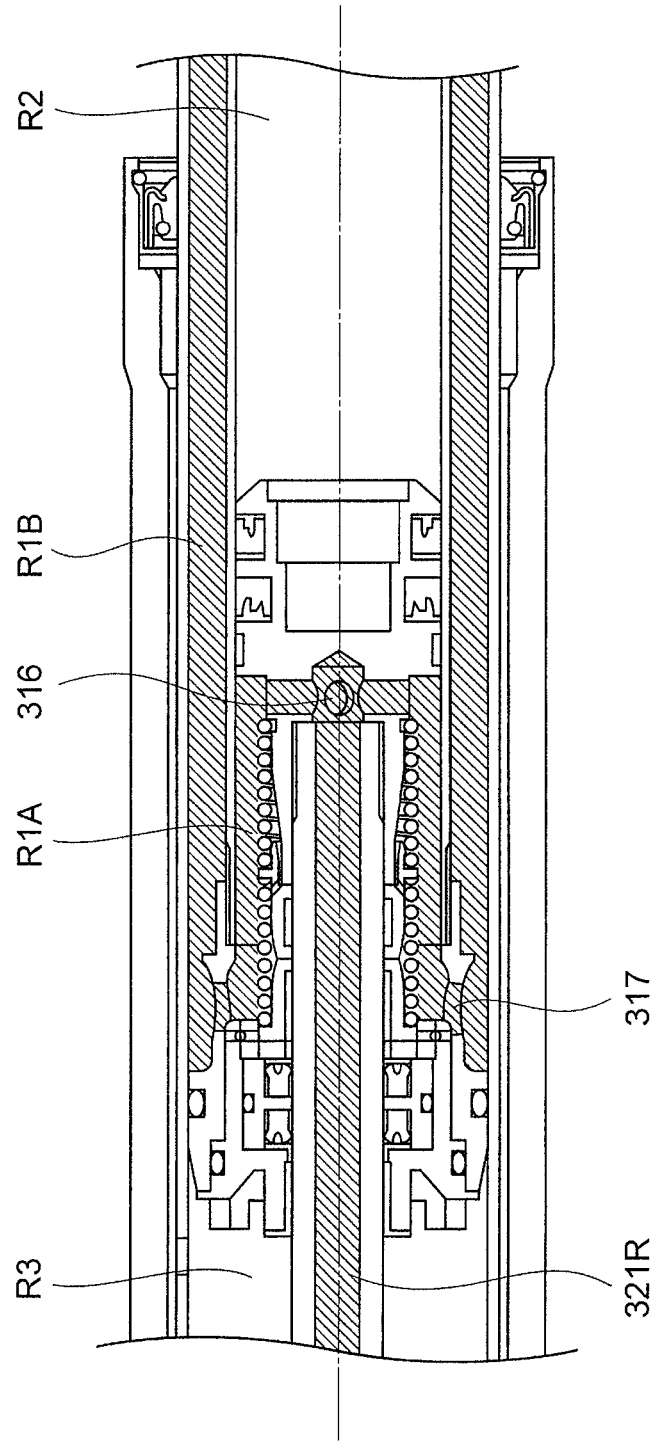
FIG. 6 is a view explaining areas of a rebound air spring chamber and a rod inner chamber.

FIG. 6 is a view explaining areas of the rebound air spring chamber R1 and the rod inner chamber 321R.

In FIG. 6, shaded portions are shown as the areas of the rebound air spring chamber R1 and the rod inner chamber 321R. As shown in the figure, the rebound air spring chamber R1 includes a space R1A on the rod member 321 side in a space sectioned by the piston 322 in the cylinder 311 and a space R1B on the cylinder 311 side in a space sectioned by the rod guide 312 between the inner tube portion 220 and the cylinder 311. The space R1A and the space R1B communicate with and connect to each other through a hole portion 317.

Additionally, an air chamber in the cylinder 311 is sectioned by the piston 322, the piston ring 323 and the seal member 324, and the inner air spring chamber R2 is formed in the wheel side of the piston 322. A gas inside the inner air spring chamber R2 is maintained in the sealed state by the piston 322, the seal member 324 and the bottom piece 314.

On the other hand, an air chamber in the inner tube 221 is sectioned by the rod guide 312 to form part of the rebound air spring chamber R1 on the wheel side and to form the outer air spring chamber R3 on the vehicle body side. A gas in the outer air spring chamber R3 is maintained in the sealed state by the outer seal member 312S of the rod guide 312 and the seal member 213 between the outer tube 211 and the inner tube 221 and the fork bolt portion 214.

Additionally, the rebound spring chamber R1, the inner air spring chamber R2 and the outer air spring chamber R3 fail to communicate with each other.

(Axle Bracket Portion 40)

The axle bracket portion 40 has a tube holding portion 41 and an axle connecting portion 42 as shown in FIG. 4. In the embodiment, the tube holding portion 41 and the axle connecting portion 42 are integrally formed.

The axle bracket portion 40 also has a gas-pressure adjustment portion 43, a quick coupler 44A and a quick coupler 44B.

The tube holding portion 41 is a cylindrical portion, having a smaller outer diameter than an inner diameter of the inner tube 221. Then, an end portion of the wheel side of the inner tube 221 is inserted into the tube holding portion 41, and the tube holding portion 41 and the inner tube 221 are screwed to each other in a liquid tight manner through a seal member 314F.

The axle connecting portion 42 has an axle hole 42H to which the axle 14S of the front wheel 14A (see FIG. 1B) is inserted. An inner diameter of the axle hole 42H can be changed by fastening an axle bolt 45, which is formed so as to fasten the axle 14S of the front wheel 14A.

The gas-pressure adjustment portion 43 communicates with the inner air spring chamber R2 through a sub-tank 43S. Accordingly, outflow of gas from an inside of the inner air spring chamber R2 to an outside can be prevented by the gas-pressure adjustment portion 43 as well as pressure of a filler gas in the inner air spring chamber R2 can be adjusted at the time of adjustment.

The quick coupler 44A and the quick coupler 44B are examples of inlets. The quick coupler 44A and the quick coupler 44B also communicate with the rebound air spring chamber R1 and the inner air spring chamber R2 respectively. Accordingly, oil can be poured into the rebound air spring chamber R1 through the quick coupler 44A as well as oil can be poured into the inner air spring chamber R2 through the quick coupler 44B. Therefore, capacities of the rebound air spring chamber R1 and the inner air spring chamber R2 can be adjusted, which facilitates the adjustment of respective compression ratios. The oil functions as a capacity adjustment material for adjusting the capacity in the rebound air spring chamber and the capacity in the inner air spring chamber in this case.

The oil in the inner air spring chamber R2 is accumulated at a side close to the bottom piece 314 in actual status of use. Accordingly, the oil may spout out from the gas-pressure adjustment portion 43 at a time of adjusting (reducing) the pressure of the filler gas inside the inner air spring chamber R2.

Figure 7:
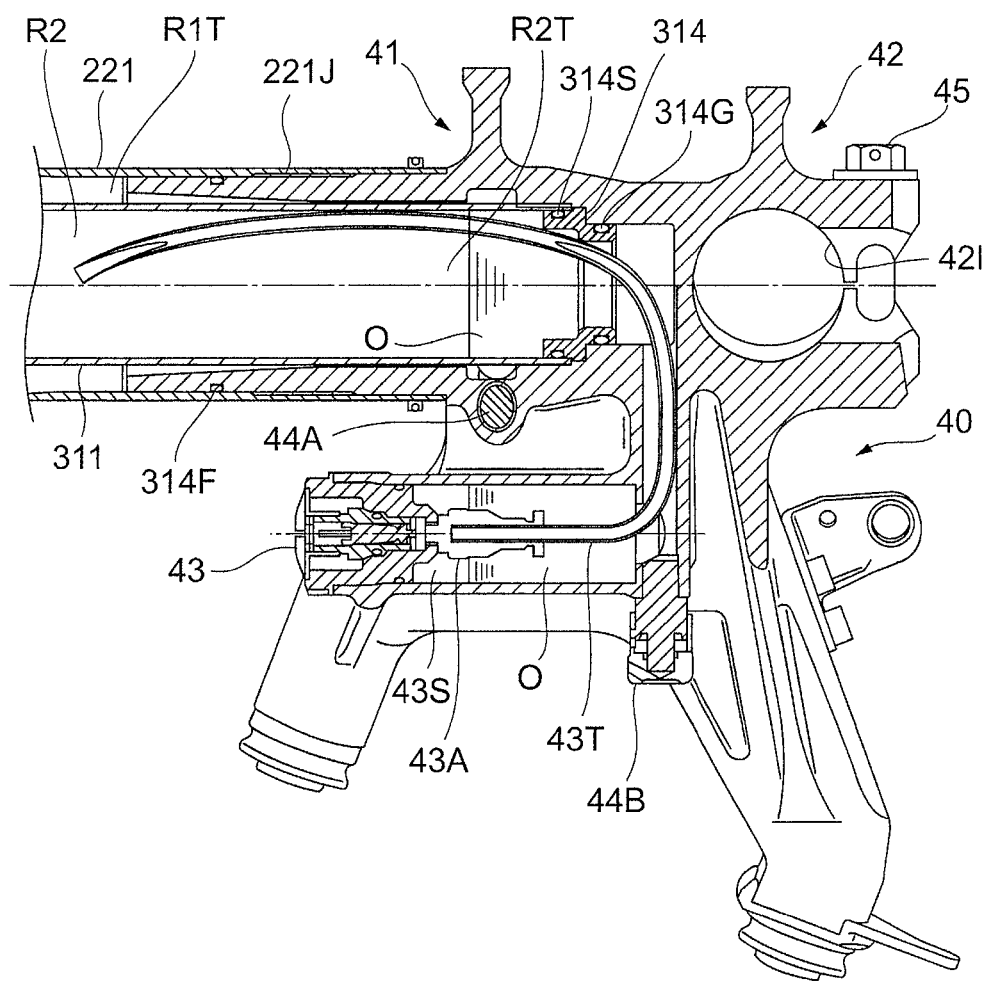
FIG. 7 is a view explaining another example of an axle bracket portion.

FIG. 7 is a view explaining another example of the axle bracket portion 40.

In FIG. 7, the inner air spring chamber R2 and the gas-pressure adjustment portion 43 communicate with each other through a tube 43T. The tube 43T is supported by a tube holding portion 43A, and the filler gas can be injected from the gas-pressure adjustment portion 43 to the inner air spring chamber R2 through the tube 43T. An end portion of the tube 43T on the inner air spring chamber R2 side is arranged so as to protrude to the vehicle-body side to be higher than the liquid level of an oil "O". Accordingly, it is possible to control the oil not to spout out from the gas-pressure adjustment portion 43 also at the time of adjusting (reducing) the pressure of the filler gas inside the inner air spring chamber R2.

Figure 8:
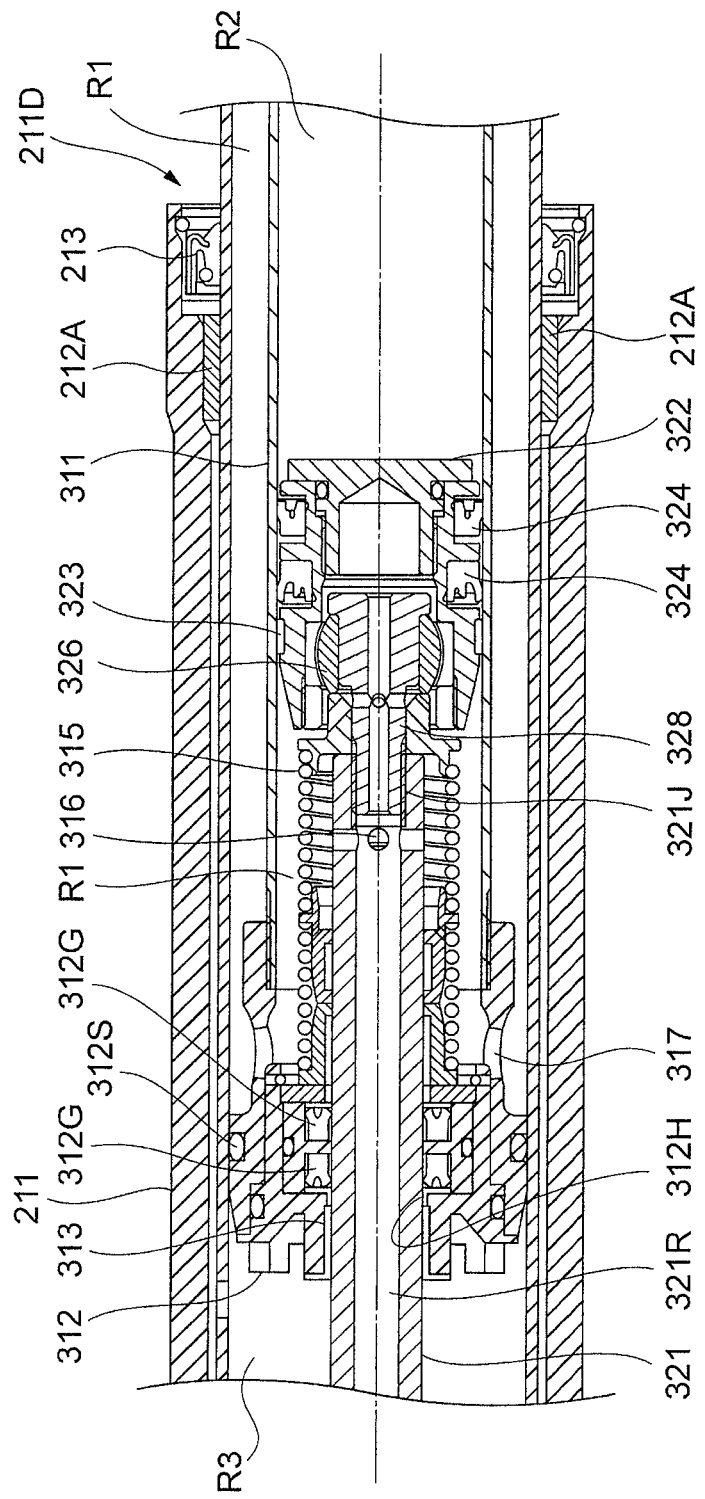
FIG. 8 is a view explaining another example of a rod portion.

FIG. 8 is a view explaining another example of the rod portion 320.

The shown rod portion 320 differs from the rod portion 320 shown in FIG. 3 in a point that a spherical bearing 326 is further provided between the piston 322 and the rod member 321.

At a time of braking of the motorcycle 1 (see FIG. 1A), a force (lateral pressure; side force) deflecting the front fork 4 (see FIGS. 1A and 1B) in a front and rear direction of the motorcycle 1 is acted. At a time of turning of the motorcycle 1, a force (lateral pressure; side force) deflecting the front fork 4 in a lateral direction of the motorcycle 1 is acted. At these times, the outer tube 211 and the inner tube 221 deflect in respective directions.

In these cases, a bending occurs between the rod member 321 which moves with the outer tube 211 and the cylinder 311 which moves with the inner tube 221. When the bending occurs, sealing performance between the piston ring 323 and the seal member 324 arranged in series to the piston 322 and the cylinder 311 is liable to be reduced. Additionally, a frictional force between the piston ring 323 as well as the seal member 324 and the cylinder 311 is increased, and the piston 322 moves less smoothly in the axial direction of the cylinder 311. Moreover, as the piston 322 is liable to move in an eccentric state, it is necessary to increase a lip interference of the seal member 324 in consideration of an amount of eccentricity. Accordingly, a frictional force between the seal member 324 and the cylinder 311 is increased also due to the above, and the piston 322 moves less smoothly in the axial direction of the cylinder 311. Furthermore, a phenomenon in which the oil is scraped by the seal member 324 and moves to another chamber may occur when the piston 322 moves.

When the spherical bearing 326 is provided, the piston 322 can swing around the spherical bearing 326. Accordingly, if the bending occurs between the rod member 321 and the cylinder 311 due to the lateral pressure, the piston 322 follows the bending and swings. As a result, the sealing performance between the piston ring 323 as well as the seal member 324 and the cylinder 311 is hardly reduced and the sealing performance is improved.

The spherical bearing 326 is a self-aligning bearing. Eccentricity of the piston 322 is corrected by providing the spherical bearing 322. Accordingly, the piston 322 hardly moves in the eccentric state. Therefore, it is possible to reduce (stabilize) the lateral pressure acting on the piston 322 and the above problems hardly occur. That is, the frictional force between the piston ring 323 as well as the seal member 324 and the cylinder 311 is hardly increased and the necessity of increasing the lip interference of the seal member 324 hardly occurs. Furthermore, the phenomenon in which the oil is scraped by the seal member 324 and moves to another chamber hardly occurs when the piston 322 moves.

In the context of a curvature radius, the smaller a diameter of the spherical bearing 326 becomes, the easier it can follow a slight deflection of the cylinder 311. However, strength of the rod end portion 328 is reduced when the diameter of the spherical bearing 326 is reduced, therefore, it is desirable to determine the diameter in view of follow-up ability and strength.

Figure 9:
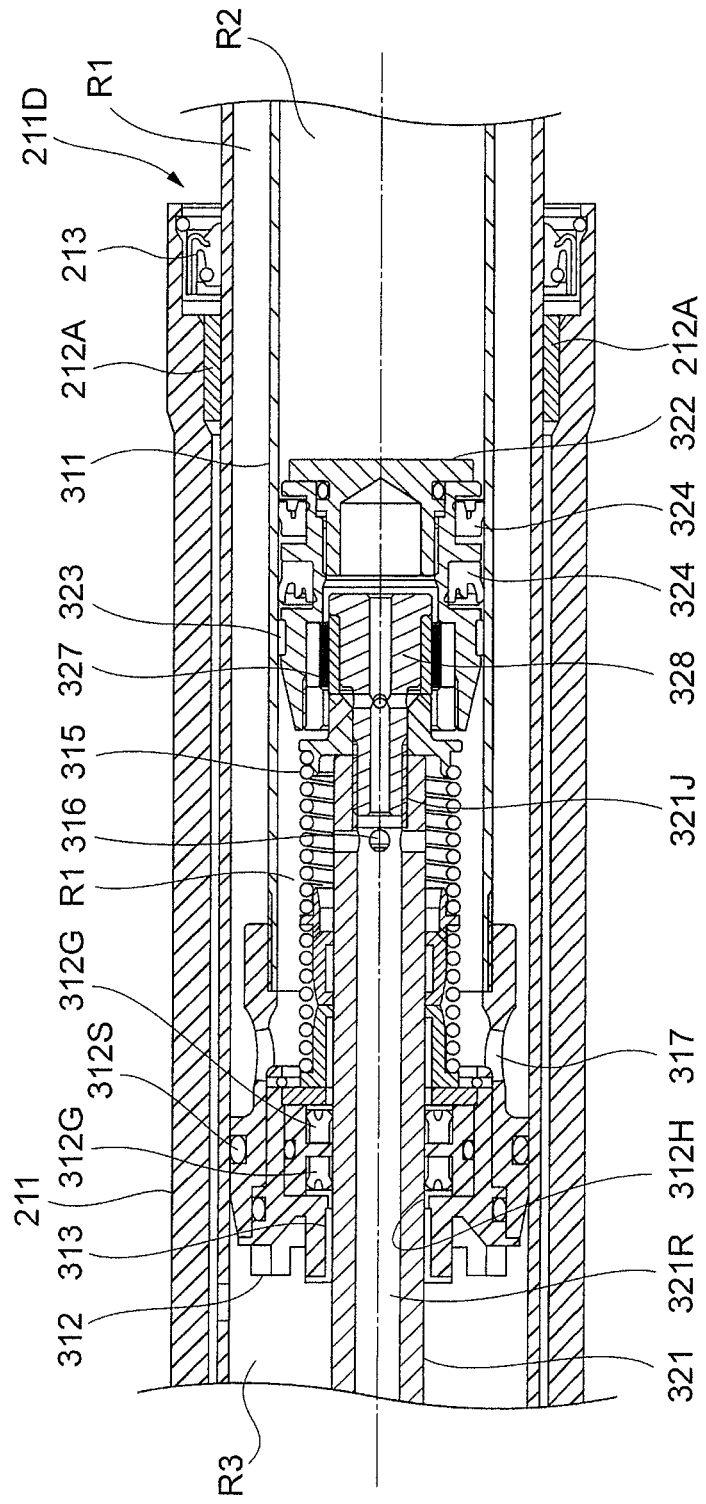
FIG. 9 is a view explaining further another example of the rod portion.

FIG. 9 is a view explaining further another example of the rod portion 320.

The shown rod portion 320 differs from the rod portion 320 shown in FIG. 8 in a point that a rubber 327 is provided between the piston 322 and the rod member 321. That is, the rubber 327 is provided instead of the spherical bearing 326 of FIG. 8.

The rubber 327 is a cylindrical member made of, for example, resin and so on, which is an elastic body. Accordingly, even when the lateral pressure is acted on the cylinder 311, the lateral pressure can be reduced as the rubber 327 is compressed. Therefore, the same effect as explained in FIG.

8 can be obtained. It is possible to respond to a deflection amount of the cylinder 311 by changing hardness or thickness of the rubber 327.

In the cases of FIG. 8 and FIG. 9, the first sectioning member is constructed by the piston 322, the piston ring 323, the seal member 324 and the spherical bearing 326 (or the rubber 327). Then, the spherical bearing 326 and the rubber 327 function as a lateral-pressure reducing member for reducing the lateral pressure generated between the first sectioning member and the cylinder 311.

FIGS. 10A and 10B are views for explaining operations in a compression-side stroke and in an extension-side stroke of the first front fork leg 11A.

(Compression-Side Stroke)

In the compression-side stroke of the first front fork leg 11A, the outer tube 211 and the inner tube 221 move in directions relatively coming close to each other in the axial direction as shown in FIG. 10A. On the other hand, the piston 322 and the rod guide 312 move in directions relatively going away from each other. Accordingly, the rod guide 312 relatively moves toward the fork bolt portion 214 of the outer tube 211, and the piston 322 moves in a direction inserted toward the wheel side in the cylinder 311.

When the rod guide 312 relatively moves toward the fork bolt portion 214 of the outer tube 211, the capacity of the outer air spring chamber R3 is reduced and air in the outer air spring chamber R3 is compressed. At this time, as the outer air spring chamber R3 is sealed, it functions as an air spring. Then, a reaction force in a direction of extending the outer tube 211 and the inner tube 221 is generated in the outer air spring chamber R3.

Similarly, as the piston 322 moves toward the wheel side of the cylinder 311, the capacity of the inner air spring chamber R2 is reduced and air in the inner air spring chamber R2 is compressed. At this time, as the inner air spring chamber R2 is sealed, it functions as an air spring. Then, a reaction force in a direction of extending the outer tube 211 and the inner tube 221 is generated also in the inner air spring chamber R2.

(Extension-Side Stroke)

In the extension-side stroke of the first front fork leg 11A, the outer tube 211 and the inner tube 221 move in directions relatively going away from each other in the axial direction as shown in FIG. 10B. On the other hand, the piston 322 and the rod guide 312 move in directions relatively coming close to each other. Accordingly, the rod guide 312 relatively moves toward the wheel side of the outer tube 211, and the piston 322 moves in a direction coming close to the vehicle-body side of the cylinder 311.

When the piston 322 moves toward the vehicle-body side of the cylinder 311, the capacity of the rebound air spring chamber R1 is reduced and air in the rebound air spring chamber R1 is compressed. The rebound air spring chamber R1 is connected to the rod inner chamber 321R. Accordingly, the rebound air spring chamber R1 and the rod inner chamber 321R function as air springs. Then, a reaction force in a direction of contracting the outer tube 211 and the inner tube 221 is generated in the rebound air spring chamber R1 and the rod inner chamber 321R.

As described above, in the front fork 4 to which the embodiment is applied, a spring force of the air spring formed by the outer air spring chamber R3 and the inner air spring chamber R2 biasing the outer tube 211 and the inner tube 221 in the direction of extending them, and a spring force of the air spring formed by the rebound air spring chamber R1 and the like biasing the outer tube 211 and the inner tube 221 in the direction of contracting them are generated with respect to the extension and compression strokes of the first front fork leg 11A.

In the embodiment, the air chamber in the inner tube 221 is sectioned by the rod guide 312 to thereby form part of the rebound air spring chamber R1 in the wheel side and to form the outer air spring chamber R3 in the vehicle body side. Accordingly, the space R1B which has been the outer air spring chamber R3 in related art can be used as part of the rebound air spring chamber R1, and the rebound air spring chamber R1 can be formed to be larger as compared with related art. As a result, the compression ratio can be reduced even under high pressure. Accordingly, the reaction force is stabilized in the vicinity of the maximum extension in the extension-side stroke, which improves steering stability.

There is a way in which a sub-tank connecting to the rebound air spring chamber R1 for increasing the rebound air spring chamber R1 is provided, however, the sub-tank protrudes to the inner air spring chamber R2 in the structure of providing the sub-tank. Accordingly, the capacity of the inner air spring chamber R2 is reduced, which may have an adverse effect. In contrast to the above, the sub-tank is not necessary in the embodiment by forming the space R1B as part of the rebound air spring chamber R1. Accordingly, a capacity reduction in the inner air spring chamber R2 by providing the sub-tank does not occur. Furthermore, manufacturing costs of the first front fork leg 11A can be reduced easily as it is not necessary to provide the sub-tank.

In the embodiment, the cylinder 311 is arranged on the wheel side as a preferable mode. In this case, it is possible to adjust capacities of the rebound air spring chamber R1 and the inner air spring chamber R2 easily by changing a length of the cylinder 311. Accordingly, the weight and manufacturing costs of the first front fork leg 11A can be reduced.

Also according to the preferable mode in which the cylinder 311 is arranged on the wheel side, the oil poured in the rebound air spring chamber R1 and the inner air spring chamber R2 for adjusting the above compression ratios can be collected in a lower part of the first front fork leg 11A. Specifically, the oil is collected in places shown by R1T and R2T in FIG. 4 and is stored there. In contrast, if the cylinder 311 is arranged on the vehicle-body side, the oil is positioned at an intermediate part in the first front fork leg 11A. Accordingly, a phenomenon in which the oil is scraped by the seal member and moves to another chamber is liable to occur when the piston 322 moves. In the embodiment, the oil is collected in the lower part of the first front fork leg 11A, the phenomenon in which the oil is scraped by the seal member hardly occurs.

When the oil can be collected in the lower part of the first front fork leg 11A, the quick coupler 44A and the quick coupler 44B can be provided, through which the oil can be poured. Accordingly, each oil amount can be adjusted more easily. As a result, each oil amount can be adjusted while the first front fork leg 11A is attached to the vehicle body, therefore, the workability at a time of adjusting the compression ratio is further improved.

What is claimed is:

1. A suspension apparatus comprising:
a vehicle-body side member formed in a tubular shape and positioned on a vehicle body side;
a wheel side member formed in a tubular shape and positioned on a wheel side, the wheel side member connecting to the vehicle-body side member, moving relatively with respect to the vehicle-body side member in an axial direction of the vehicle-body side member;
a tubular cylinder provided inside the vehicle-body side member and the wheel side member;

a rod member positioned inside the vehicle-body side member and the wheel side member, moving relatively in an axial direction of the cylinder with movement of the vehicle-body side member and the wheel side member;

a first sectioning member fixed to an end portion of a wheel side of the rod member and provided in a manner of contacting the cylinder so as to move in the axial direction of the cylinder to thereby section a space in the cylinder; and a second sectioning member fixed to an end portion of a vehicle-body side of the cylinder and sectioning a space in the wheel side member, wherein a first chamber positioned on a rod member side of the first sectioning member and on a cylinder side of the second sectioning member to accommodate fluid, a second chamber positioned on an opposite side of the rod member side of the first sectioning member to accommodate fluid, and a third chamber positioned on an opposite side of the cylinder side of the second sectioning member to accommodate fluid are formed by the first sectioning member and the second sectioning member, each of the first to third chambers includes a filler gas inside in a sealed state so as to function as an air spring, and the first to third chambers fail to communicate with each other.

2. The suspension apparatus according to claim 1, wherein the cylinder is fixed so as to move with the wheel side member in an end portion of the wheel side, and the rod member is fixed so as to move with the vehicle-body side member in an end portion of the vehicle-body side.

3. The suspension apparatus according to claim 1, wherein the first chamber includes a space on the rod member side in a space sectioned by the first sectioning member in the cylinder, and a space on the cylinder side in a space between the wheel side member and the cylinder, which is sectioned by the second sectioning member.

4. The suspension apparatus according to claim 1, further comprising:

injection ports for injecting a capacity adjustment material for adjusting a capacity of the first chamber and a capacity of the second chamber.

5. The suspension apparatus according to claim 1, wherein the rod member has a space portion inside, which is formed in an axial direction thereof, and the space portion is connected to the first chamber.

6. The suspension apparatus according to claim 1, further comprising:

a gas pressure adjustment portion for adjusting a pressure of the filler gas in the second chamber, wherein the second chamber and the gas pressure adjustment portion communicate with each other through a tube.

7. The suspension apparatus according to claim 1, wherein the first sectioning member includes a lateral-pressure reducing member that reduces a lateral pressure generated between the first sectioning member and the cylinder.

8. A suspension system comprising:

a first suspension unit including a suspension spring made of an air spring; and a second suspension unit including a damping mechanism, wherein the first suspension unit includes a vehicle-body side member formed in a tubular shape and positioned on a vehicle body side, a wheel side member formed in a tubular shape and positioned on a wheel side, the wheel side member connecting to the vehicle-body side member, moving relatively with respect to the vehicle-body side member in an axial direction of the vehicle-body side member, a tubular cylinder provided inside the vehicle-body side member and the wheel side member, a rod member positioned inside the vehicle-body side member and the wheel side member, moving relatively in an axial direction of the cylinder with movement of the vehicle-body side member and the wheel side member, a first sectioning member fixed to an end portion of a wheel side of the rod member and provided in a manner of contacting the cylinder so as to move in the axial direction of the cylinder to thereby section a space in the cylinder, and a second sectioning member fixed to an end portion of a vehicle-body side of the cylinder and sectioning a space in the wheel side member, wherein a first chamber positioned on a rod member side of the first sectioning member and on a cylinder side of the second sectioning member to accommodate fluid, a second chamber positioned on an opposite side of the rod member side of the first sectioning member to accommodate fluid and a third chamber positioned on an opposite side of the cylinder side of the second sectioning member to accommodate fluid are formed by the first sectioning member and the second sectioning member, each of the first to third chambers includes a filler gas inside in a sealed state so as to function as an air spring, and the first to third chambers fail to communicate with each other.

* * * * *